(12) United States Patent
LaRiviere et al.

(10) Patent No.: US 7,210,669 B1
(45) Date of Patent: May 1, 2007

(54) DEFORMABLE FASTENER (75) Inventors: Brent L. LaRiviere, Tacoma, WA (US); Alan K. Forsythe, Kent, WA (US)

(73) Assignee: GT Development Corporation, Auburn, WA (US)

( * ) Notice: Subject to any disclaimer, the term of this patent is extended or adjusted under 35 U.S.C. 154(b) by 0 days.

(21) Appl. No.: 10/793,484

(22) Filed: Mar. 4, 2004

Related U.S. Application Data (60) Provisional application No. 60/452,479, filed on Mar. 4, 2003.

(51) Int. Cl.
F16K 51/00 (2006.01)

(52) U.S. Cl. ...................................................... 251/285

(58) Field of Classification Search ................ 251/284, 251/285; 285/259
See application file for complete search history.

(56) References Cited

U.S. PATENT DOCUMENTS

| 1,909,941 A | 5/1933 | Finch |
| 1,935,938 A * | 11/1933 | Buck ........................... 251/358 |
| 2,979,067 A * | 4/1961 | Kern, Jr. et al. .......... 137/15.19 |
| 3,515,419 A | 6/1970 | Baugh |
| 3,574,362 A * | 4/1971 | Gregg et al. ................. 285/321 |
| 4,893,645 A * | 1/1990 | Augustinas et al. ... 137/315.03 |
| 5,076,615 A * | 12/1991 | Sampson ..................... 285/253 |
| 5,375,450 A * | 12/1994 | Mori ............................ 72/393 |
| 5,454,676 A | 10/1995 | Conte |
| 5,676,309 A * | 10/1997 | Lee et al. .................. 236/93 R |
| 5,730,335 A * | 3/1998 | Maas et al. .................. 222/341 |
| 5,879,119 A | 3/1999 | Robinson |
| 6,012,763 A | 1/2000 | Clemente et al. |
| 6,076,425 A | 6/2000 | Worrell et al. |
| 6,152,495 A * | 11/2000 | Hoffmann et al. ...... 285/148.19 |
| 6,190,102 B1 | 2/2001 | Vignotto et al. |

* cited by examiner

*Primary Examiner*—J. Casimer Jacyna
(74) *Attorney, Agent, or Firm*—Christensen O'Connor Johnson Kindness PLLC (57) ABSTRACT A deformable fastener is provided. The fastener includes a first member having a cavity and a second member sized to be rotatably attached within the cavity. The fastener further includes a protrusion disposed on either the first or second member for locking engagement with a corresponding portion of the other of the first or second member when the first member is attached to the second member. The protrusion is sized and configured to deform both an inner and outer surface of the corresponding portion to assist in maintaining the locking engagement.

20 Claims, 8 Drawing Sheets

DEFORMABLE FASTENER

CROSS-REFERENCE TO RELATED APPLICATION

This application claims the benefit of U.S. Provisional Application No. 60/452,479, filed Mar. 4, 2003, the disclosure of which is hereby expressly incorporated by reference and priority from the filing date of which is hereby claimed under 35 U.S.C. § 119(e).

FIELD OF THE INVENTION

The present invention relates generally to fasteners and, more particularly, to deformable fasteners.

BACKGROUND OF THE INVENTION

Fasteners of various sorts have been around for hundreds of years. Often, a fastener, such as a threaded bolt, is threaded into a bore having corresponding threads. The threaded bolt is rotated, resulting in the bolt advancing into the bore until a head of the bolt engages the material of which the bore is disposed in. By tightening the bolt further, the head of the bolt is firmly seated against the material and the threads of the bolt are firmly interlocked with the threads of the bore. The seating of the head against the material and interlocking of the threads results in the creation of large frictional forces preventing the bolt from backing out under all but the most extreme circumstances. However, although the risk of the bolt backing out is small, in some cases, the resulting consequences of the bolt backing out are large, therefore requiring the use of a safety fastener.

Safety fasteners include additional structures which deform to keep the fastener in a fully tightened position. For instance, in one previously developed safety fastener disclosed in U.S. Pat. No. 5,454,676, issued to Conte (hereinafter "Conte"), the safety fastener includes reeding 11 disposed on a male part 2. The fastener is additionally secured in a fully tightened position by the deformation of the reeding 11 upon a lateral surface of a seat 12 and or conical flaring 14 of a female part 6 which receives the male part 2. However Conte teaches using the reeding 11 to aid in securing the male part 2 in one position only, the fully secured position. Therefore, Conte does not teach female and male parts which may be selectively rotated relative to one another and held in a plurality of positions by the reeding 11. Thus the safety fastener of Conte does not fulfill the need for a fastener that is adjustable such that the male and female portions of the fastener may be held in one of many angular displacements relative to one another.

Further, Conte teaches at best only the deformation of the inside periphery of the female portion once the female and male parts are fully tightened. Conte therefore fails to teach or suggest configuring the reeding 11 to deform both the outer and inner periphery of the female part such that the female part changes shape to a new shape, wherein the new shape resists the rotation of the male part within the female portion.

Further still, Conte teaches at best, the temporary deformation of the female part, wherein once the female part is released from the male part, the parts elastically rebound to their original shapes. Thus, Conte fails to teach either the permanent and/or plastic deformation of the female part by the male part.

Thus, there exits a need for a deformable adjustable fastener having corresponding parts rotatable relative to one another which may be adjusted to a plurality of angular displacements relative to one another, and held in one of the selected angular displacements without backing out or tightening. This is often the case when a fastener is used as an adjustment device, such as to selectively control the opening of a valve. Further, there exists a need for a fastener having a deformable wall which undergoes permanent and/or plastic deformation to increase the resistance to rotation of the parts of the fastener relative to one another once the parts are set in their selected positions. Further still, there exists a need for a fastener having a deformable wall wherein the deformable wall deforms along both an interior and outer surface of the deformable wall during engagement of the corresponding parts of the fastener such that the entire wall changes shape, and not just an inner surface.

SUMMARY OF THE INVENTION

A deformable fastener formed in accordance with one embodiment of the present is provided. The deformable fastener includes a first member having a cavity and a second member sized to be rotatably attached within the cavity. The deformable fastener includes a protrusion disposed on either the first or second member for locking engagement with a corresponding portion of the other of the first or second member when the first member is attached to the second member. The protrusion is sized and configured to deform both an inner and outer surface of the corresponding portion to assist in maintaining the locking engagement.

A deformable fastener formed in accordance with an alternate embodiment of the present invention is provided. The deformable fastener includes a deformable member having a deformable cavity and a firm member rotatingly receivable within the deformable cavity. The deformable fastener includes a protrusion disposed on either the deformable member or the firm member. When the deformable member receives the firm member, the protrusion is sandwiched between the deformable member and the firm member causing the deformable cavity to permanently deform into a locking shape to impede rotation of the deformable member relative to the firm member.

A deformable fastener formed in accordance with yet another embodiment of the present invention is provided. The deformable fastener includes a deformable member including a deformable cavity having an engagement surface. The deformable fastener further includes a firm member having an outer surface, the firm member rotatingly receivable within the deformable cavity. Rotation of the firm member causes a separation distance between the firm and deformable members to be adjusted. A protrusion is disposed on the outer surface of the firm member or on the engagement surface of the deformable cavity. When the deformable member rotatingly receives the firm member, the protrusion is sandwiched between the engagement surface and the outer surface of the firm member causing the deformation of the deformable cavity into a locking shape. The locking shape is adapted to hold the firm member in any one of a plurality of selected angular orientations relative to the deformable member.

A deformable fastener formed in accordance with yet another embodiment of the present invention is provided. The deformable fastener includes a first member having a cavity and a second member sized to be rotatably attached and lockingly engaged to the first member. The second member is sized and configured to be received at least partially in the cavity and lockingly engaged to the first member. Rotation of the first member relative to the second member results in a separation distance of the first member from the second member to be adjusted. A protrusion is disposed on either the first or second member for locking engagement with a corresponding portion of the other of the first or second member when the first member is attached to the second member. The protrusion is sized and configured to permanently deform both an inner and outer surface of the corresponding portion to assist in maintaining locking engagement of the first member in one of a plurality of angular orientations, each of the plurality of angular orientations corresponding to a different separation distance of the first member from the second member.

A valve assembly formed in accordance with one embodiment of the present invention is provided. The valve assembly includes a deformable fastener having a first member having a cavity and a second member sized to be rotatably attached within the cavity. Rotation of the first member relative to the second member adjusts an over-all-length of the first and second members when attached to one another. A protrusion is disposed on either the first or second member for locking engagement with a corresponding portion of the other of the first or second member when the first member is attached to the second member. The protrusion is sized and configured to deform the corresponding portion to assist in maintaining the locking engagement. The valve assembly further includes a valve having a closed position for impeding flow of a fluid through the valve and an open position for permitting flow of the fluid through the valve. The valve assembly additionally includes an actuator mechanism for actuating the valve from the closed position to the open position once the actuator mechanism is moved a selected distance. The deformable fastener interfaces with the valve and the actuator mechanism such that adjustment of the over-all-length of the deformable fastener causes a corresponding adjustment of the selected distance.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

FIGS. 1 and 3–15 illustrate one embodiment of a deformable fastener 100 formed in accordance with the present invention. The deformable fastener 100 is suitable for use with a valve 200 depicted in FIGS. 2 and 3. Although the illustrated embodiment of the present invention will be described as a deformable fastener 100 implemented as an adjustable cam follower for use in a valve 200, one skilled in the relevant art will appreciate that the disclosed deformable fastener 100 is illustrative in nature and should not be construed as so limited. It should therefore be apparent that the deformable fastener 100 has wide application, and may be used in any situation where impeding the rotation of a first portion of a fastener relative to a second portion of a fastener is desirable.

Figure 1:
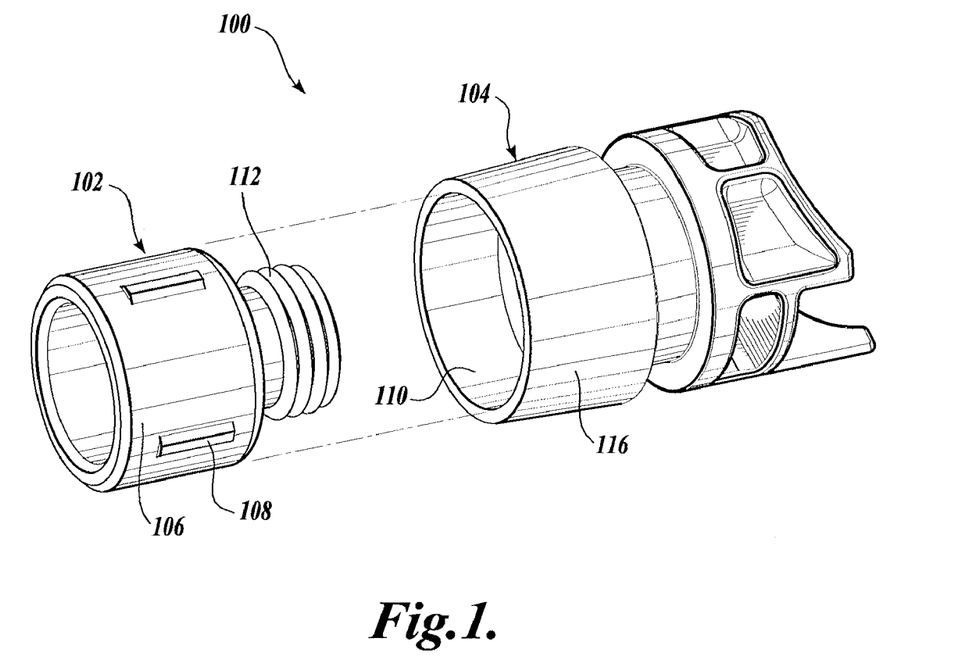
FIG. 1 is an exploded perspective view of one embodiment of a deformable fastener formed in accordance with the present invention showing a male portion of the deformable fastener disengaged from a female portion.
Figure 2:
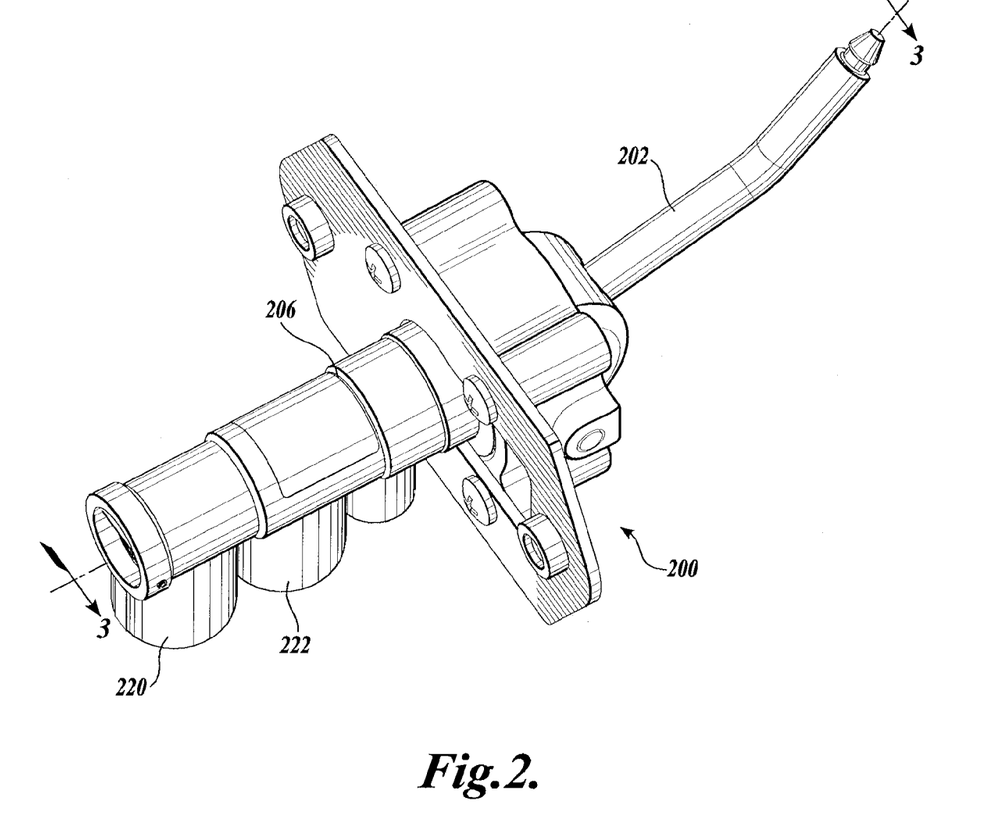
FIG. 2 is a perspective view of a valve which is suitable for use with the deformable fastener depicted in FIG. 1.
Figure 3:
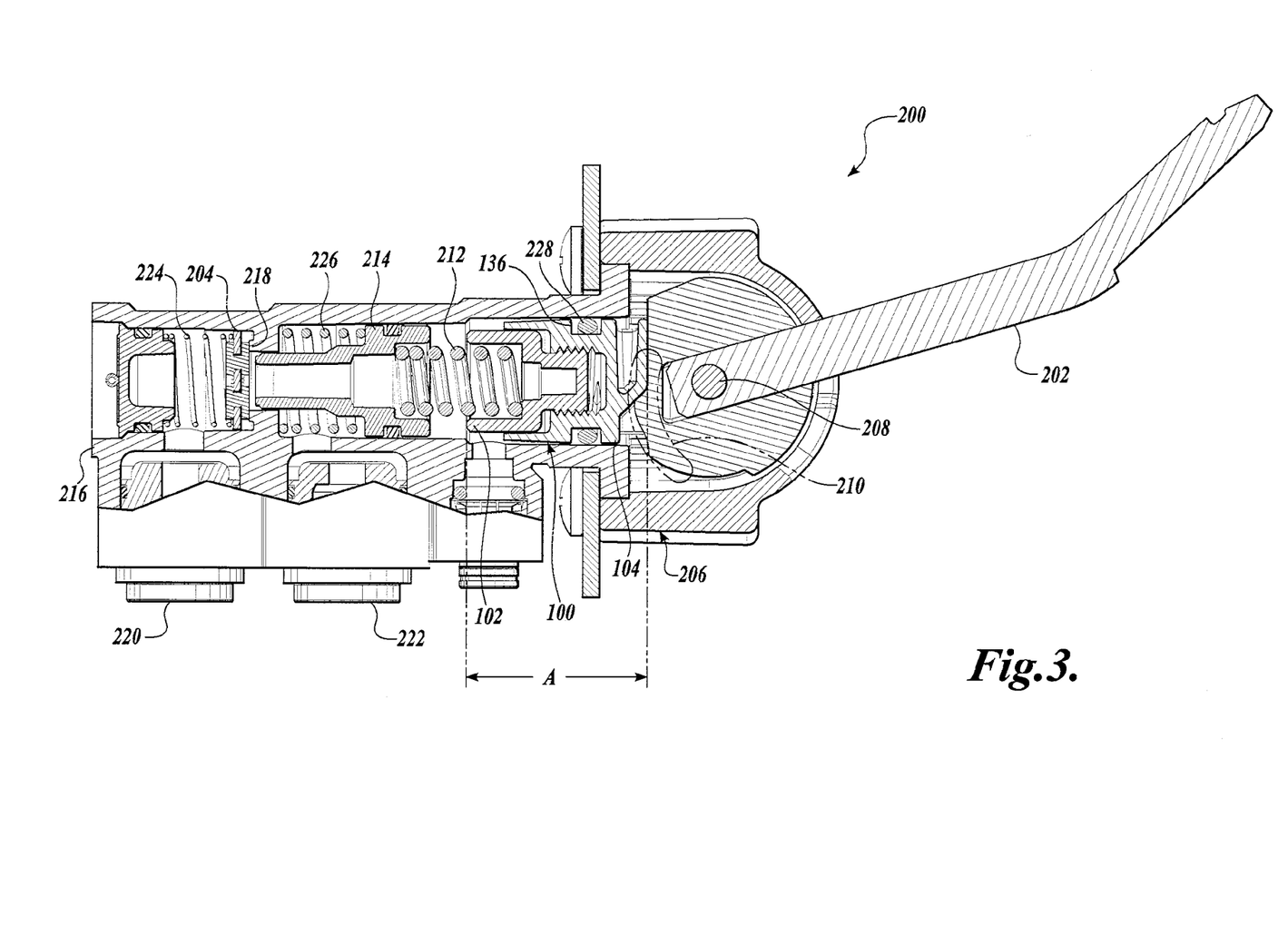
FIG. 3 is a cross-sectional view of the valve of FIG. 2, the cross-sectional cut taken substantially through Section 3—3 of FIG. 2, showing the deformable fastener of FIG. 1 disposed within the valve.

Referring to FIGS. 1–3, the deformable fastener 100 includes a male portion 102 sized and configured to be received within a female portion 104 and define a separation distance A when the male portion 112 is received within the female portion 104. In the illustrated embodiment, the deformable fastener 100 is depicted in conjunction with the valve 200, whereby adjusting the separation distance A varies a characteristic of the valve 200, such as the point at which movement of a valve handle 202 lifts a poppet 204, as will be discussed in greater detail below.

More specifically, and focusing on the valve 200 depicted in FIGS. 2 and 3, the valve handle 202 is coupled to a valve body 206 by a well known pivot pin 208. Attached to a distal end of the valve handle 202 is a cam 210. By rotating the valve handle 202 about the pivot pin 208, the deformable fastener 100 is selectively driven axially along its length. Seated within the deformable fastener 100 is a cam spring 212. The cam spring 212 biases a plunger 214 axially away from the deformable fastener 100 and toward a poppet 204. After the plunger 214 is actuated a sufficient distance toward the poppet 204, the plunger 214 engages the poppet 204, thereby lifting the poppet 204 from its seat 218. After the poppet 204 is lifted from the seat 218, a pressurized fluid, such as pressurized air, is permitted to flow from a supply port 220 to a delivery port 222, thereby pressurizing the equipment coupled thereto.

The poppet 204 is biased toward its seat 218 by a second spring 224. The plunger 214 is likewise biased toward the deformable fastener 100 by a third spring 226. Thus, by selectively adjusting the separation distance A, the point at which rotation of the valve handle 202 initiates the lifting of the poppet 204 from the seat 218 is adjusted. Therefore, the point at which the supply port 220 is placed in fluid communication with the delivery port 222 is adjustable through manipulating the separation distance A.

Figure 4:
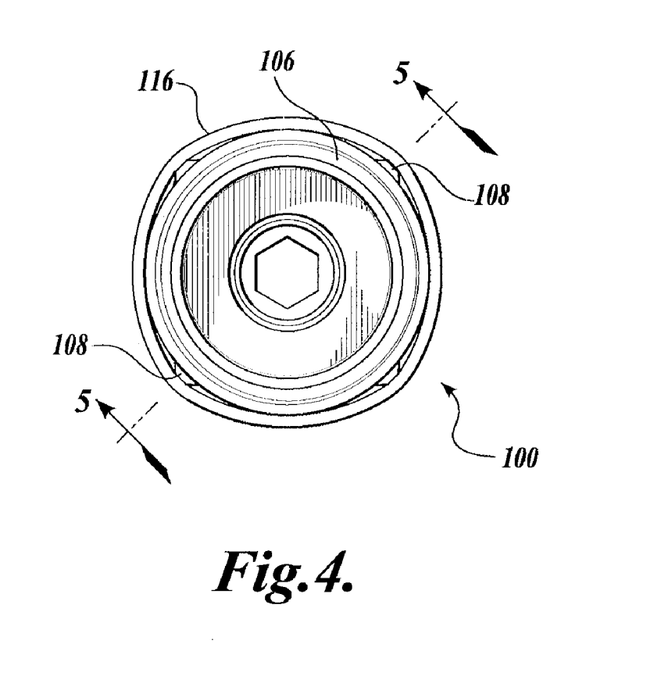
FIG. 4 is an end view of the deformable fastener depicted in FIG. 1, wherein the male portion of the deformable fastener is received within the female portion.

Referring to FIGS. 1 and 4, the deformable fastener 100 will now be described in greater detail. The male portion 102 is substantially formed from a substantially rigid material, such as a plastic. In the illustrated embodiment, the male portion 102 is formed from a nylon resin, such as DUPONT'S ZYTEL® nylon resin.

The male portion 102 is adapted to be received by the female portion 104 in such a manner so that after the separation distance A is selected by the user, the male and female portions 102 and 104 interact to impede inadvertent change in the separation distance A by other than user manipulation.

The male portion 102 includes a plurality of protrusions 108 that engage the female portion 104, when the male portion 102 is received within the female portion 104. Such engagement of the protrusions 108 causes the deformation of at least a section of the female portion 104. The protrusions 108 cause the female portion 104 to deform into a locking shape, such as a circular/polygon hybrid, which then interlocks with the protrusions 108, thereby impeding further rotation. Thus, the interaction of the protrusions 108 with the female portion 104 impedes the rotation of the male portion 102 relative to the female portion 104, as will be discussed in further detail below.

Referring to FIGS. 5–9, the male portion 102 also includes a cylindrical body 106. The cylindrical body 106 includes an inner cavity 118 extending between an open end 120 and an externally threaded closed end 122 of the cylindrical body 106. The open end 120 of the cylindrical body 106 includes an outer chamfer edge 124 and an inner chamfer edge 126.

Disposed within the cavity 118 is an annually shaped shoulder 128. The shoulder 128 extends between the cavity 118 and a recess 130 having a diameter smaller than the diameter of the cavity 118. Located adjacent the recess 130 and extending into the male portion 102 is a retaining portion 131. The retaining portion 131 is sized and configured to receive a head of a well known wrench, such as an Allen wrench (not shown), thereby allowing the wrench to be operatively inserted within the recess 130 to aid the user in selectively rotating the male portion 102 relative to the female portion 104.

Extending radially outward from the cylindrical body 106 is a series of four protrusions 108. The protrusions 108 extend axially along the outer surface of the cylindrical body 106. In the illustrated embodiment, the protrusions 108 are suitably spaced at 90-degree intervals about the circumference of the cylindrical body 106. Although in the illustrated embodiment a specific shape and number of protrusions are shown and described, it should be apparent to one skilled in the art that the protrusions are illustrative in nature, and the shape, orientation, spacing, quantity, etc. of the protrusions 108 may be varied to best suit the application.

Referring to FIGS. 1–3 and 10–15, the female portion 104 of the deformable fastener 100 will now be described in further detail. The female portion 104 of the deformable fastener 100 includes a cylindrical body 116 having a receiving chamber 110 sized and configured to receive the cylindrical body 106 of the male portion 102. The receiving chamber 110 is defined by the inner peripheral wall of the cylindrical body 116 and includes an open end 134 and a closed end 132. The receiving chamber 110 may be concentrically located within the cylindrical body 116. The closed end 132 of the receiving chamber 110 includes an internally threaded portion 114 adapted to receive correspondingly shaped external threads of the male portion 102.

In one embodiment, the inner diameter of the receiving chamber 110 increases from a first diameter located at the closed end 132 to a second larger diameter at the open end 134 and the outer surface of the cylindrical body 116 decrease from a first diameter located at the closed end 132 to a second smaller diameter at the open end 134. Thus, the thickness of the cylindrical body 116 may be tapered from a first thickness at the base of the cylindrical body 116 to a smaller second thickness at the open end 134 of the cylindrical body 116.

Referring to FIG. 3 in conjunction with FIGS. 10–15, an annular groove 136 is located circumferentially around the cylindrical body 106. The annular groove 136 is configured to receive a well-known seal 228 therein. The seal 228 provides a seal between an inner surface of the body 206 of the valve 200 and the deformable fastener 100.

The female portion 104 is formed from a deformable, semi-rigid material, such as a plastic. In the illustrated embodiment, the female portion 104 is formed from an acetal resin, such as DUPONT'S DELRIN® acetal resin.

Figure 5:
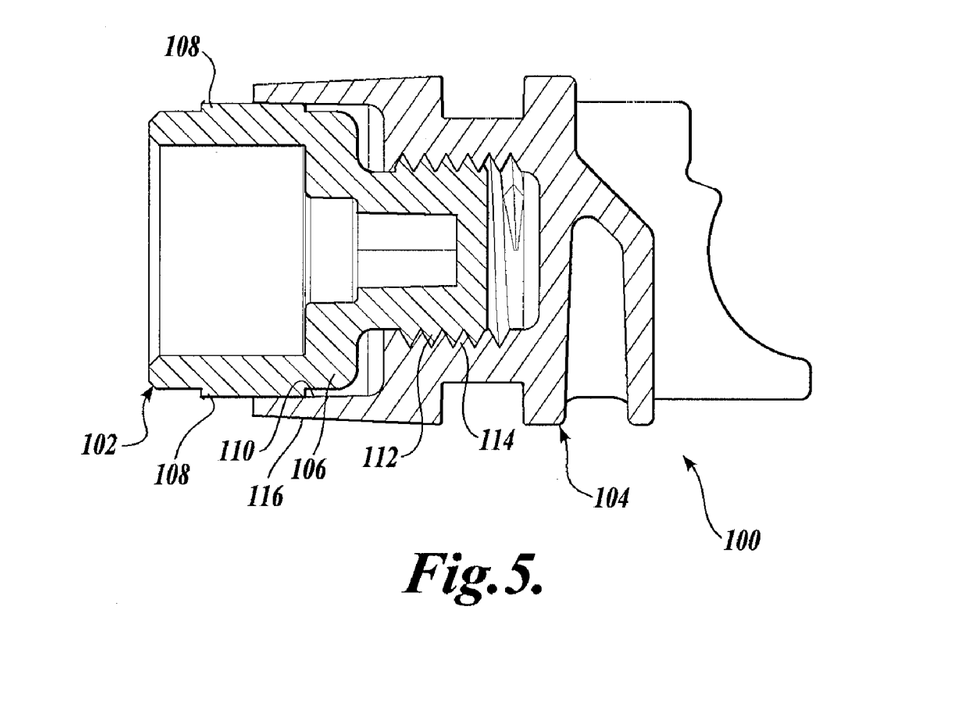
FIG. 5 is a cross-sectional view of the deformable fastener depicted in FIG. 4, wherein the cross-sectional cut is taken substantially through Section 5—5 of FIG. 4.
Figures 6, 7, 8, 9:
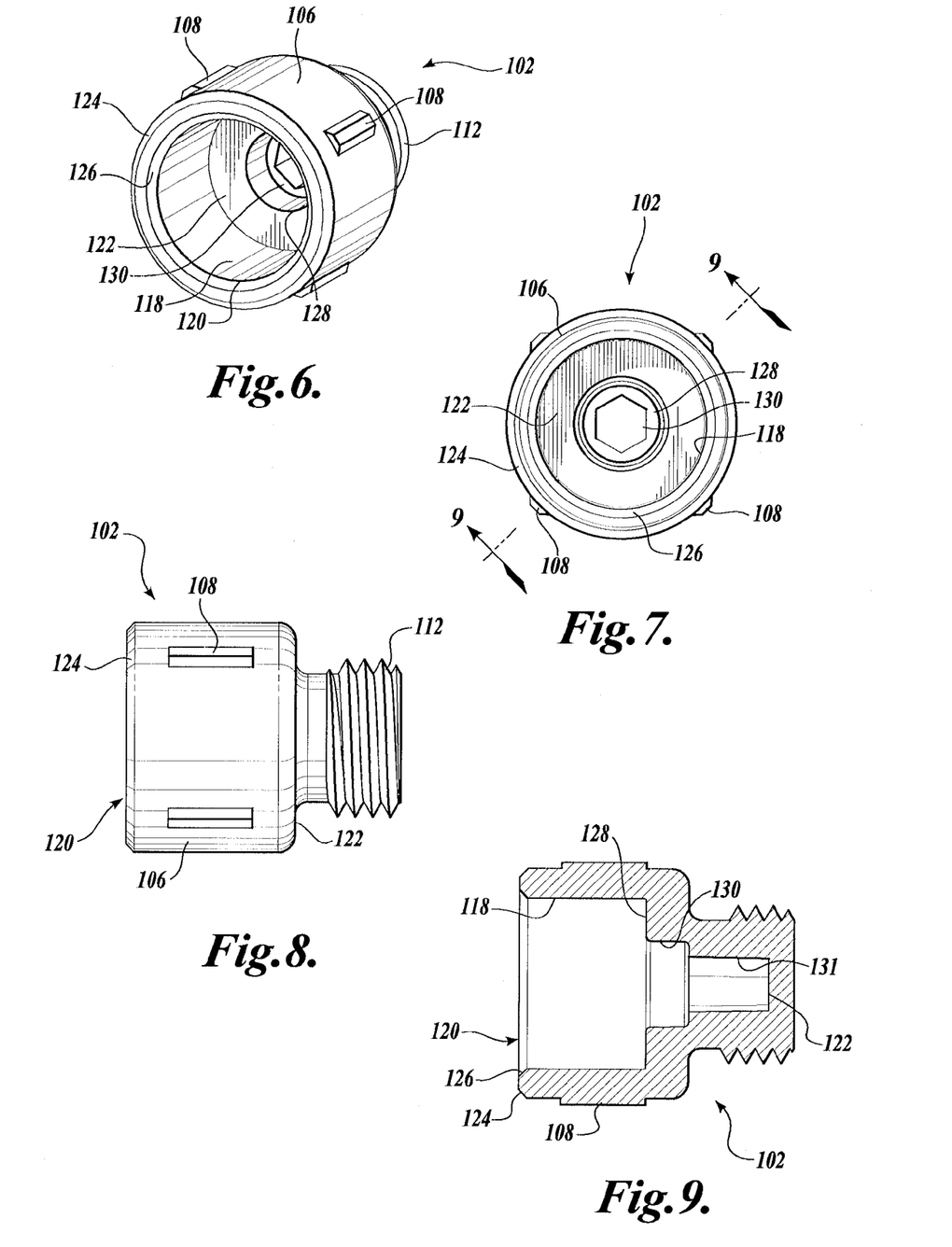
FIG. 6 is a perspective view of the male portion of the deformable fastener depicted in FIG. 1.
FIG. 7 is an end view of the male portion of the deformable fastener depicted in FIG. 6.
FIG. 8 is an elevation view of the male portion of the deformable fastener shown in FIG. 6.
FIG. 9 is a cross-sectional view of the male portion of the deformable fastener shown in FIG. 7, the cross-sectional cut taken substantially through Section 9—9 of FIG. 7.
Figure 10:
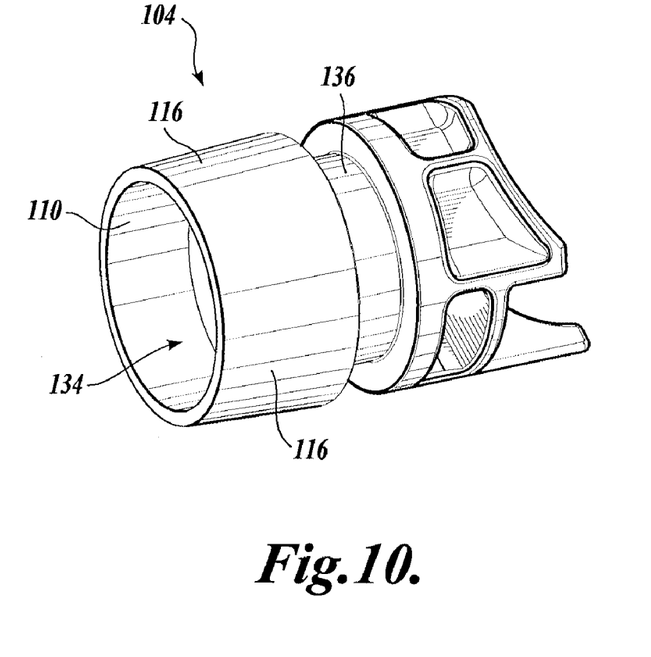
FIG. 10 is a perspective view of the female portion of the deformable fastener shown in FIG. 1, showing the receiving chamber of the female portion of the deformable fastener.
Figure 11:
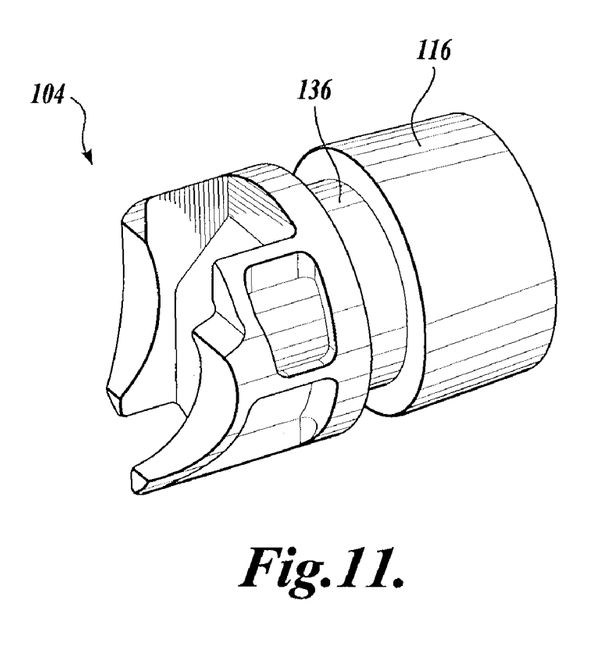
FIG. 11 is a perspective view of the female portion of the deformable fastener shown in FIG. 1, showing the cam follower end of the female portion of the deformable fastener.
Figure 12:
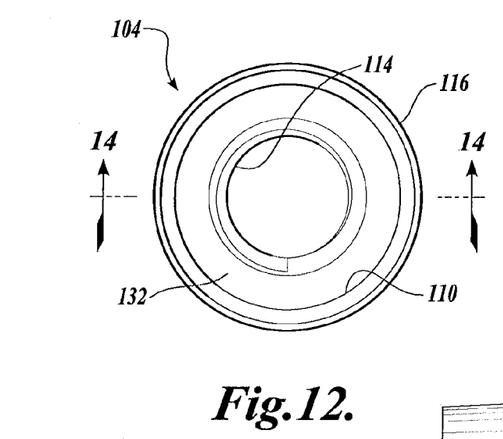
FIG. 12 is an end view of the female portion of the deformable fastener shown in FIGS. 10 and 11.
Figure 13:
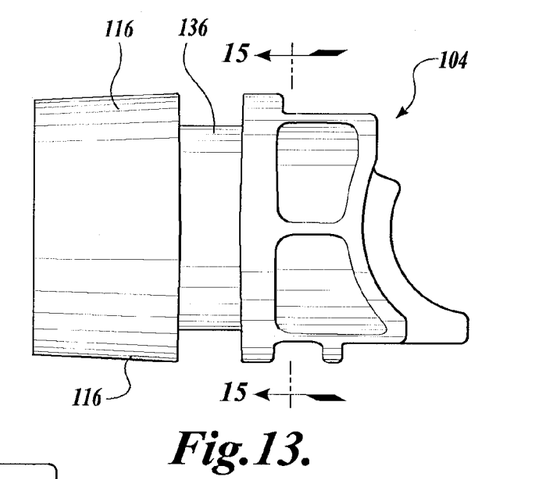
FIG. 13 is an elevation view of the female portion of the deformable fastener shown in FIGS. 10 and 11.
Figure 14:
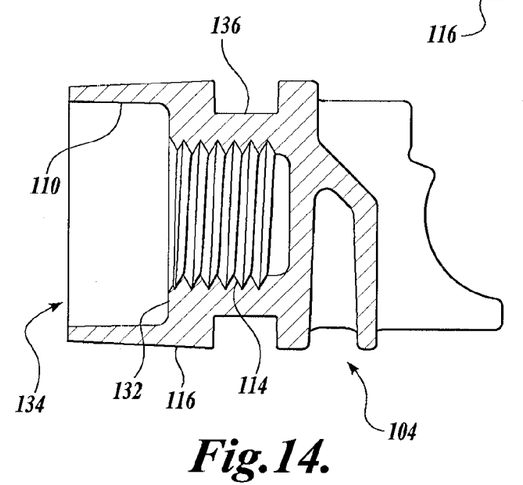
FIG. 14 is a cross-sectional view of the female portion of the deformable fastener shown in FIGS. 10 and 11, wherein the cross-sectional cut is taken substantially through Section 14—14 of FIG. 12.
Figure 15:
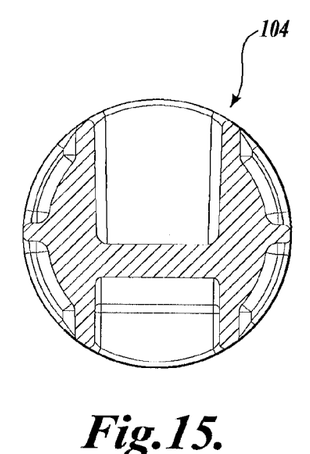
FIG. 15 is a cross-sectional view of the female portion of the deformable fastener shown in FIGS. 10 and 11, wherein the cross-sectional cut is taken substantially through Section 15—15 of FIG. 13.

Operation of the deformable fastener 100 may be best understood by referring to FIGS. 1, 4, and 5. To couple the male portion 102 to the female portion 104, the male portion 102 is inserted within the receiving chamber 110 of the female portion 104, such that the threaded portion 112 of the male portion 102 is received by the corresponding threaded portion 114 of the female portion 104. Inasmuch as the protrusions 108 do not extend the full length of the cylindrical body 106, the protrusions 108 do not engage the cylindrical body 116 of the female portion 104 during initial engagement of the threaded portions of the male and female portions 102 and 104.

As the male portion 102 is rotated further with respect to the female portion 104, the male portion 102 is drawn within the female portion 104, thereby decreasing the separation distance A. As rotation of the male portion 102 continues, the protrusions 108 engage the inner surface of the receiving chamber 110 to cause the deformation of the cylindrical body 116 of the female body 104. More specifically, the cylindrical body 116 of the female portion 104 is deformed from its initial circular shape, shown in FIG. 12, to its deformed circular/square hybrid shape depicted in FIG. 4. After the male portion 102 is rotated a predetermined amount to place the male portion 102 a selected distance from the female portion 104, the user ceases rotation of the male portion 102. Due to the tapering of the cylindrical body 116, (i.e., the increase in thickness of the cylindrical body 116 of the female portion 104 in the direction of the closed end 22), when the male portion 102 is received further within the female portion 104, the torque required to rotate the male portion 102 within the female portion 104 increases.

The height of the protrusions 108 is preferably selected to cause the plastic deformation of the cylindrical body 116 of the female portion 104 at the points of contact between the protrusions 108 and the cylindrical body 116.

Although the height of the protrusions 108 is described as causing plastic deformation, the height and/or materials of the fastener may also be selected to cause a permanent set to occur in the material of the cylindrical body 116 without subjecting the material to plastic deformation. Moreover, a material of the cylindrical body 116 may be selected that once deformed into a selected shape, the material permanently sets into the selected shape despite the fact that the material has not undergone plastic deformation. It should be apparent to those skilled in the art that such materials are suitable for use with and are within the spirit and scope of the present invention.

Thus after the male portion 102 has been selectively positioned within the female portion 104 and allowed to remain in this position for an extended period, a permanent set or shape of the cylindrical body 116 of the female portion 104 occurs. Thus the interactions of the protrusions 108 with the cylindrical body 116 of the female portion 104 impedes the further rotation of the male portion 102 within the female portion 104 of the deformable fastener 100, thus aiding in the maintaining of the proper separation distance, due to the permanent set of the cylindrical body 116 of the female portion 104.

More specifically, the protrusions 108 deform the cylindrical body 116 of the female portion 104 into a locking shape. In the illustrated embodiment, because four protrusions 108 are disposed on the male portion 102, the cylindrical body 116 of the female portion 104 is deformed into a circular/square hybrid locking shape, as shown in FIG. 4. If a rotating torque is applied to either the male or female portions 102 and 104, the protrusions 108 engage the locking shape of the cylindrical body 116 of the female portion 104 to impede rotation. Thus, further rotation is impeded through engagement of the protrusions 108 with the locking shape and by the friction forces generated through the contact of the protrusions 108 with the cylindrical body 116.

Instead of stretching the entire circumference of the female portion 104, the protrusions 108 cause localized deformation of the cylindrical body 116 at the point of protrusion 108 and cylindrical body 116 contact. Therefore, the protrusions 108 reshape the cylindrical body 116 from its initial shape to a second shape, the second shape preferably being a hybrid of the initial shape and a polygon, the specific shape of the polygon determined by the number of protrusions 108 present on the male portion 102. Preferably, both the inner and outer peripheries of the cylindrical body 116 are deformed, i.e. the cylindrical body 116 is formed of a thin wall of sufficiently pliable material such that the entire wall is displaced by contact with the protrusions 108. Thus, a deformable fastener 100 formed in accordance with the present invention is initially easy to adjust, but after permanent and/or plastic deformation sets in, the rotational holding power of the male portion 102 relative to the female portion 104 is increased.

Although the cylindrical body 116 of the female portion 104 is described as being deformed through the interaction of the protrusions 108 of the male portion 102 with the cylindrical body 116, it should be apparent to one skilled in the art that the deformable fastener 100 of the present invention is also suitable for use in applications wherein the material of the cylindrical body 116 of the female portion 104 is not forced to exceed its yield point, and therefore, operates elastically during use, i.e., is elastically deformed.

Figure 16:
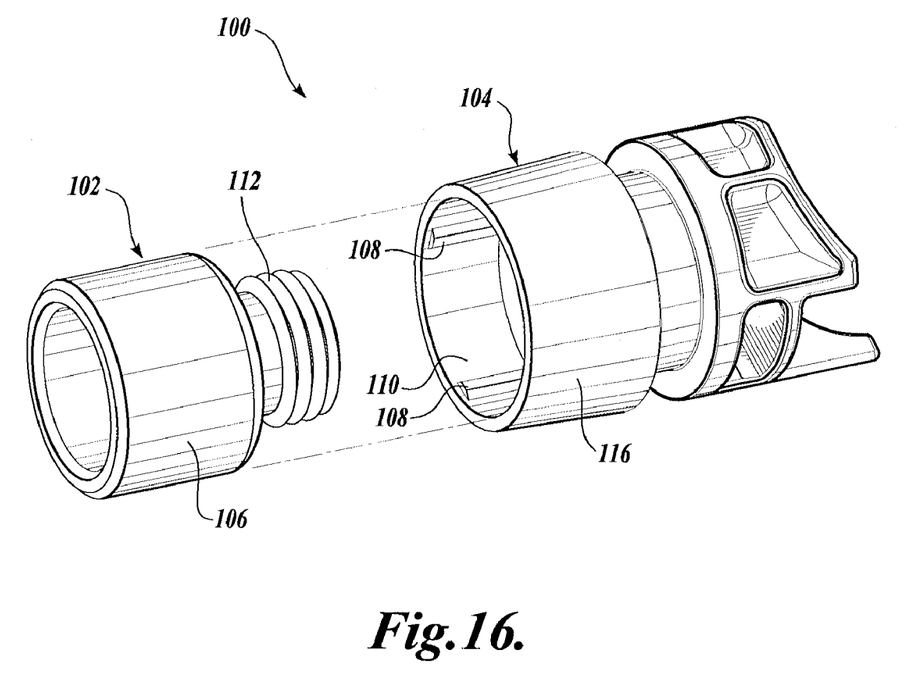
FIG. 16 is an exploded perspective view of an embodiment of a deformable fastener formed in accordance with the present invention showing a male portion of the deformable fastener disengaged from a female portion.

Further still, although the illustrated embodiment depicts the protrusions 108 as disposed upon the male portion 102, it should be apparent to one skilled in the art that protrusions 108 may alternately be disposed upon the female portion 104 (see FIG. 16). Additionally, although the illustrated embodiment depicts the male portion 102 as being formed from a rigid material and the female portion 104 being formed from a deformable material, it should be apparent to those skilled in the art that both the male and female portions may be made from deformable material or the male portion may be made from a deformable material and the female portion from a rigid material without departing from the spirit and scope of the present invention.

While the preferred embodiment of the invention has been illustrated and described, it will be appreciated that various changes can be made therein without departing from the spirit and scope of the invention.

The invention claimed is:

1. A deformable fastener comprising:
   (a) a first member having a cavity with inner and outer surfaces defining a first shape;
   (b) a second member sized to be rotatably attached within the cavity; and
   (c) a protrusion disposed on either the first or second member for locking engagement with a corresponding portion of the other of the first or second member when the first member is attached to the second member, the protrusion sized and configured to deform both inner and outer surfaces of the corresponding portion of the cavity to assist in maintaining the locking engagement, wherein when deformed, both the inner and outer surfaces of the corresponding portion of the cavity change from the first shape to a second shape, and wherein rotation of the first member relative to the second member causes a separation distance between the first and second members to be adjusted.

2. The deformable fastener of claim 1, wherein the protrusion is sized and configured to cause the inner and outer surfaces of the corresponding portion to permanently deform.

3. The deformable fastener of claim 1, wherein the protrusion is sized and configured to cause the inner and outer surfaces of the corresponding portion to undergo plastic deformation.

4. The deformable fastener of claim 1, wherein the second member is rotatable to one of a plurality of angular orientations relative to the first member and adapted to be held in one of the plurality of angular orientations by the deformation of the corresponding portion.

5. A deformable fastener comprising:
   (a) a first member having a cavity with inner and outer surfaces defining a first shape;
   (b) a second member sized to be rotatably attached within the cavity; and
   (c) a protrusion disposed on either the first or second member for locking engagement with a corresponding portion of the other of the first or second member when the first member is attached to the second member, the protrusion sized and configured to deform both inner and outer surfaces of the corresponding portion of the cavity to assist in maintaining the locking engagement, wherein when deformed, both the inner and outer surfaces of the corresponding portion of the cavity change from the first shape to a second shape, and wherein the cavity is defined by a wall, wherein the wall increases in thickness such that as a separation distance between the first and second members is decreased, a resistance to deformation of the wall increases to correspondingly increase a rotational resistance impeding rotation of the first member relative to the second member.

6. A deformable fastener comprising:
(a) a first member having a cavity with inner and outer surfaces defining a first shape;
(b) a second member sized to be rotatably attached within the cavity;
(c) a protrusion disposed on either the first or second member for locking engagement with a corresponding portion of the other of the first or second member when the first member is attached to the second member, the protrusion sized and configured to deform both inner and outer surfaces of the corresponding portion of the cavity to assist in maintaining the locking engagement, wherein when deformed, both the inner and outer surfaces of the corresponding portion of the cavity change from the first shape to a second shape, and
(d) a cam engagement surface disposed on either the first or second member, the cam engagement surface adapted to engage a cam.

7. A deformable fastener comprising:
(a) a deformable member having a deformable cavity;
(b) a firm member rotatingly receivable within the deformable cavity; and
(c) a protrusion disposed on either the deformable member or the firm member, wherein when the deformable member receives the firm member, the protrusion is sandwiched between the deformable member and the firm member causing the deformable cavity to permanently deform into a locking shape to impede rotation of the deformable member relative to the firm member, wherein rotation of the firm member relative to the deformable member causes a separation distance between the deformable and firm members to adjust.

8. The deformable fastener of claim 7, wherein the deformable cavity undergoes plastic deformation when permanently deformed into the locking shape.

9. The deformable fastener of claim 7, wherein when the deformable cavity undergoes permanent deformation into the locking shape, both outer and inner surfaces of the deformable cavity change shape.

10. The deformable fastener of claim 7, wherein the firm member is held in one of a plurality of angular orientations relative to the deformable member by the permanent deformation of the deformable cavity into the locking shape.

11. A deformable fastener comprising:
(a) a deformable member having a deformable cavity;
(b) a firm member rotatingly receivable within the deformable cavity; and
(c) a protrusion disposed on either the deformable member or the firm member, wherein when the deformable member receives the firm member, the protrusion is sandwiched between the deformable member and the firm member causing the deformable cavity to permanently deform into a locking shape to impede rotation of the deformable member relative to the firm member, wherein as a separation distance between the firm and deformable members is decreased, a resistance of the deformable cavity to deformation increases to likewise increase a rotational resistance impeding rotation of the deformable member relative to the firm member.

12. A deformable fastener comprising:
(a) a deformable member having a deformable cavity;
(b) a firm member rotatingly receivable within the deformable cavity; and
(c) a protrusion disposed on either the deformable member or the firm member, wherein when the deformable member receives the firm member, the protrusion is sandwiched between the deformable member and the firm member causing the deformable cavity to permanently deform into a locking shape to impede rotation of the deformable member relative to the firm member, wherein a wall forming the deformable cavity increases in thickness along a length of the wall to increase the resistance of the wall to deformation.

13. A deformable fastener comprising:
(a) a deformable member including a deformable cavity having an engagement surface, wherein the deformable cavity has a first shape;
(b) a firm member having an outer surface, the firm member rotatingly receivable within the deformable cavity, wherein rotation of the firm member causes a separation distance between the firm and deformable members to be adjusted; and
(c) a protrusion disposed on the outer surface of the firm member or on the engagement surface of the deformable cavity, wherein when the deformable member rotatingly receives the firm member, the protrusion is sandwiched between the engagement surface and the outer surface of the firm member causing the deformation of the deformable cavity from the first shape into a locking shape, the locking shape adapted to hold the firm member in any one of a plurality of selected angular orientations relative to the deformable member.

14. The deformable fastener of claim 13, wherein the deformable cavity is adapted to permanently set into the locking shape.

15. The deformable fastener of claim 13, wherein the deformable cavity undergoes plastic deformation when deformed into the locking shape.

16. The deformable fastener of claim 13, wherein the deformable cavity has an open end for receiving the firm member and an opposite end, wherein a wall defining the deformable cavity decreases in thickness from the opposite end to the open end.

17. The deformable fastener of claim 13, wherein when the deformable cavity is deformed into the locking shape, both outer and inner surfaces of the deformable cavity change shape.

18. The deformable fastener of claim 13, wherein rotation of the firm member within the deformable cavity causes a distance between the deformable member and the firm member to change.

19. A deformable fastener comprising:
(a) a first member having a cavity;
(b) a second member sized to be rotatably attached and lockingly engaged to the first member, the second member sized and configured to be received at least partially in the cavity and lockingly engaged to the first member, wherein rotation of the first member relative to the second member results in a separation distance of the first member from the second member to be adjusted; and
(c) a protrusion disposed on either the first or second member for locking engagement with a corresponding portion of the other of the first or second member when the first member is attached to the second member, the protrusion sized and configured to permanently deform both inner and outer surfaces of the corresponding portion to assist in maintaining locking engagement of the first member in one of a plurality of angular orientations, each of the plurality of angular orientations corresponding to a different separation distance of the first member from the second member.

20. A valve assembly comprising:
(a) a deformable fastener having:
   (i) a first member having a cavity;
   (ii) a second member sized to be rotatably attached within the cavity, wherein rotation of the first member relative to the second member adjusts an overall-length of the first and second members when attached to one another; and
   (iii) a protrusion disposed on either the first or second member for locking engagement with a corresponding portion of the other of the first or second member when the first member is attached to the second member, the protrusion sized and configured to deform the corresponding portion to assist in maintaining the locking engagement;
(b) a valve having a closed position for impeding flow of a fluid through the valve and an open position for permitting flow of the fluid through the valve; and
(c) an actuator mechanism for actuating the valve from the closed position to the open position once the actuator mechanism is moved a selected distance, wherein the deformable fastener interfaces with the valve and the actuator mechanism such that adjustment of the overall length of the deformable fastener causes a corresponding adjustment of the selected distance.

* * * * *